(12) United States Patent
Ota (10) Patent No.: US 8,488,218 B2
(45) Date of Patent: Jul. 16, 2013

(54) DOCUMENT READING APPARATUS (75) Inventor: Mitsuhiro Ota, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 471 days.

(21) Appl. No.: 12/768,598

(22) Filed: Apr. 27, 2010

(65) Prior Publication Data

US 2010/0284047 A1 Nov. 11, 2010

(30) Foreign Application Priority Data

May 8, 2009 (JP) ................................. 2009-113569

(51) Int. Cl.
N04N 1/04 (2006.01)

(52) U.S. Cl.
USPC ............................ 358/475; 358/509; 358/474

(58) Field of Classification Search
USPC ................ 358/474, 1.15, 475, 497, 1.9, 501, 358/505, 509
See application file for complete search history.

(56) References Cited

U.S. PATENT DOCUMENTS

| | | | | |
|---|---|---|---|---|
| 4,505,572 A | * | 3/1985 | Ashida et al. | 399/22 |
| 5,078,497 A | * | 1/1992 | Borton et al. | 356/446 |
| 5,161,233 A | * | 11/1992 | Matsuo et al. | 399/136 |
| 5,453,611 A | * | 9/1995 | Oozu et al. | 250/208.1 |
| 5,638,103 A | * | 6/1997 | Obata et al. | 347/164 |
| 5,650,863 A | * | 7/1997 | Utagawa et al. | 358/475 |
| 5,971,276 A | * | 10/1999 | Sano et al. | 235/462.01 |
| 5,983,057 A | * | 11/1999 | Matsuo et al. | 399/207 |
| 6,153,879 A | * | 11/2000 | Yoshinaga et al. | 250/271 |
| 6,462,821 B1 | * | 10/2002 | Borton et al. | 356/446 |
| 6,493,013 B2 | * | 12/2002 | Obata et al. | 347/139 |
| 7,151,603 B2 | * | 12/2006 | Kellie | 356/342 |
| 7,916,362 B2 | * | 3/2011 | Kijima et al. | 358/500 |
| 7,933,450 B2 | * | 4/2011 | Furuki | 382/188 |

FOREIGN PATENT DOCUMENTS

| | | |
|---|---|---|
| JP | 5-265287 A | 10/1993 |
| JP | 2007-034040 A | 2/2007 |

* cited by examiner

Primary Examiner — Negussie Worku
(74) Attorney, Agent, or Firm — Canon USA, Inc., IP Division (57) ABSTRACT A document reading apparatus includes an irradiation unit configured to irradiate a document reading position with visible light and infrared light, a reading unit configured to read an image of visible light and an image of infrared light reflected from the document on the document reading position, and an extraction unit configured to extract a transparent toner image on a document based on the visible light image and the infrared light image read by the reading unit.

6 Claims, 7 Drawing Sheets

DOCUMENT READING APPARATUS

BACKGROUND OF THE INVENTION

1. Field of the Invention

The present invention relates to a document reading apparatus that reads a document on which a transparent toner image is formed.

2. Description of the Related Art

Japanese Patent Application Laid-Open No. 5-265287 and Japanese Patent Application Laid-Open No. 2007-034040 discuss a copying machine employing an electrophotographic method which forms a glossy image using transparent toner. Japanese Patent Application Laid-Open No. 5-265287 discusses a copying machine which determines a non-character area in an image of a read document and forms an image with respect to the non-character area using transparent toner. Further, Japanese Patent Application Laid-Open No. 2007-034040 discusses a copying machine which analyzes a read document image such as a presentation material. The copying machine then forms an image using transparent toner only in an area containing a photographic image and not in an area containing graphs and drawings. The above-described copying machines thus form images using transparent toner in areas which require gloss according to the features of the document image.

However, when the above-described copying machines copy a document including both a glossy portion formed of the transparent toner and a non-glossy portion not formed of the transparent toner, the copying machines cannot copy the glossy portion as the glossy portion and the non-glossy portion as the non-glossy portion. To realize such copying, it is necessary for the copying machine to read the document on which a transparent toner image is formed and to extract the transparent toner image on the document to be read.

SUMMARY OF THE INVENTION

According to an aspect of the present invention, a document reading apparatus includes an irradiation unit configured to irradiate a document reading position with visible light and infrared light, a reading unit configured to read an image of visible light and an image of infrared light reflected from the document on the document reading position, and an extraction unit configured to extract a transparent toner image on a document based on the visible light image and the infrared light image read by the reading unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
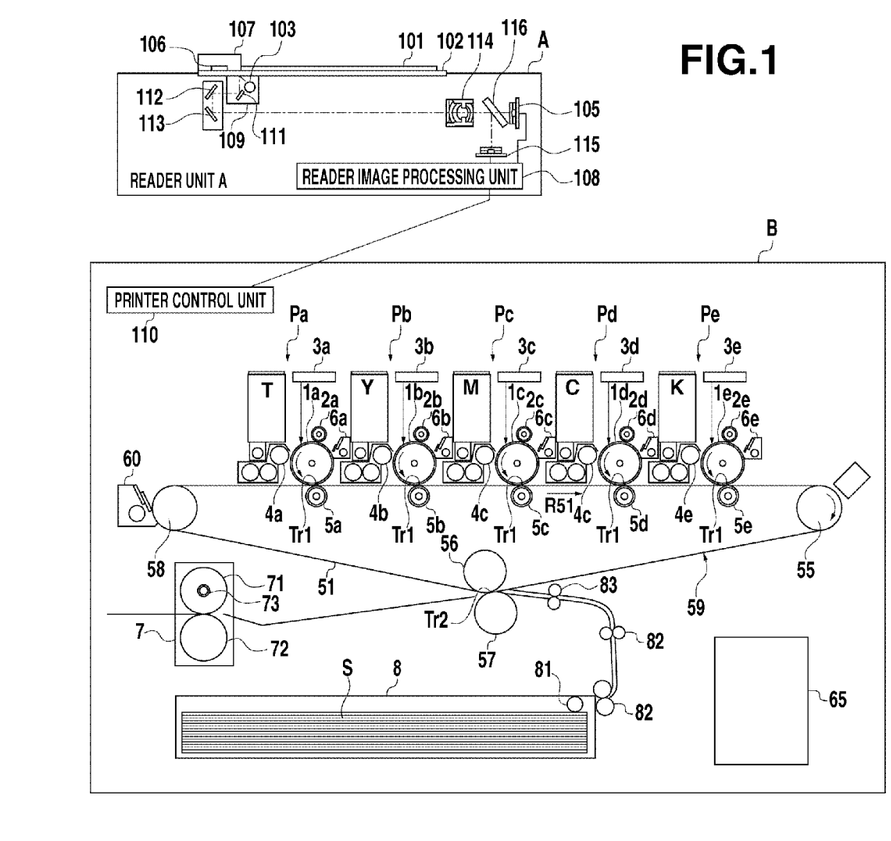
FIG. 1 illustrates a configuration of an image forming apparatus according to an exemplary embodiment of the present invention.

FIG. 1 illustrates a configuration of an image forming apparatus according to an exemplary embodiment of the present invention. Referring to FIG. 1, the image forming apparatus includes a reader unit (i.e., a document reading apparatus) A which reads the document, and a printer unit B which employs an electrophotographic method to output a document read by the reader unit A.

A document 101 placed on a document positioning glass plate 102 (i.e., on a document reading position) of the reader unit A is irradiated by a light source 103. The light source 103 emits visible light (380 nm to 750 nm) and infrared light (750 nm to 2500 nm). The visible light reflected from the document 101 is focused on an image sensor (i.e., a charge-coupled device (CCD) sensor) 105 via mirrors 111, 112, and 113, a lens 114, and a half mirror 116. The infrared light reflected off from the document 101 is focused on an image sensor (i.e., a CCD sensor) 115 via the mirrors 111, 112, and 113, the lens 114, and the half mirror 116. The half mirror 116 reflects the infrared light and transmits the visible light.

The CCD sensor 105 is formed of CCD line sensors arranged in three rows. Each of the CCD line sensors receiving the visible light generates red (R), green (G), and blue (B) color component signals respectively. The CCD sensor 115 is a CCD line sensor which can read the infrared light and generates the infrared light component signal upon receiving the infrared light.

An image reading optical unit 109 including the light source 103 and the mirror 111 moves along the document positioning glass plate 102 to scan-read the document 101 placed thereon. The document may also be scan-read by keeping the image reading optical unit 109 still at a predetermined position and moving the document on the document reading position using a document conveying apparatus (not illustrated). Upon receiving light reflected from the document on the document positioning glass plate 102, the CCD sensors 105 and 115 sequentially convert the image of the document 101 to electrical signals (image signals) for each line and output the electrical signals. A reader image processing unit 108 then performs image processing on the image signals for each line acquired by the CCD sensors 105 and 115. The processed signals are transmitted to a printer control unit 110 in the printer unit B which controls the printer unit B to form an image on a sheet according to the image signals received from the reader image processing unit 108.

A positioning member 107 which prevents oblique positioning of the document 101 by coming into contact with one edge of the document is disposed adjacent to the document positioning glass plate 102. Further, a reference white plate 106 is disposed below the positioning member 107. The reference white plate 106 determines a white level of the CCD sensor 105 and performs shading correction in a main scanning direction of the CCD sensors 105 and 115 (i.e. a direction in which the image sensors are arranged).

Figure 2:
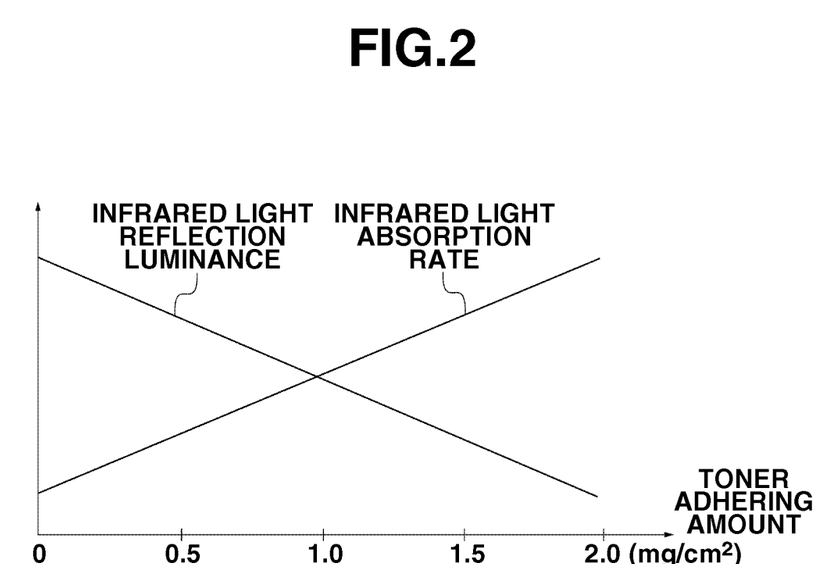
FIG. 2 is a graph illustrating a relation between an infrared absorption rate of toner and toner adhering amount.

The CCD sensor 115 for receiving the infrared light is included in the image forming apparatus according to the present exemplary embodiment for the following reason. FIG. 2 is a graph illustrating a relation between an infrared light absorption rate of the toner and the toner adhering amount, and a relation between an infrared light reflection luminance of the toner and the toner adhering amount in a document in which a toner image is formed. Color toner is formed by mixing a polyester resin which is a thermally fusable binding resin with a colorant. The transparent toner is formed of the polyester resin without mixing the colorant. An example of the polyester resin is a polymeric compound containing ester linkages in the main chain that is synthesized by a diol compound and dicarboxylic acid. The "color" toner according to the present exemplary embodiment includes black toner to be identifiable from the transparent toner.

The polyester resin absorbs infrared light. As described above, both the color toner and the transparent toner contain polyester resin. The absorption rate of the infrared light thus increases as the toner adhering amount per unit area increases as illustrated in FIG. 2 regardless of whether the toner is the color toner or the transparent toner. More specifically, when the document on which the toner image is formed irradiated with infrared light, the luminance of the infrared light reflected from the document decreases as the toner adhering amount increases. The toner adhering amount can thus be acquired by converting the luminance of the reflected infrared light to luminance density. The toner adhering amount indicates the adhering amount of the color toner and the transparent toner. If the color toner image is not formed, the toner adhering amount indicates the transparent toner adhering amount. If the transparent toner image is not formed, the toner adhering amount indicates the color toner adhering amount.

On the other hand, the image forming apparatus irradiates the document on which the toner image is formed with visible light and reads the reflected light from the document for each color component (i.e., R, G, and B). The image forming apparatus then performs luminance density conversion and under color removal (UCR). Since the image forming apparatus reads the reflected visible light, the image forming apparatus reads only the color toner on the document and not the transparent toner. As a result, the adhering amounts of yellow (Y), magenta (M), cyan (C), and black (B) toners can be acquired, and the toner adhering amount thus indicates the color toner adhering amount. In other words, the transparent toner adhering amount can be acquired using the toner adhering amount acquired from the reflected infrared light luminance and the toner adhering amount acquired from the reflected visible light luminance.

Figure 3:
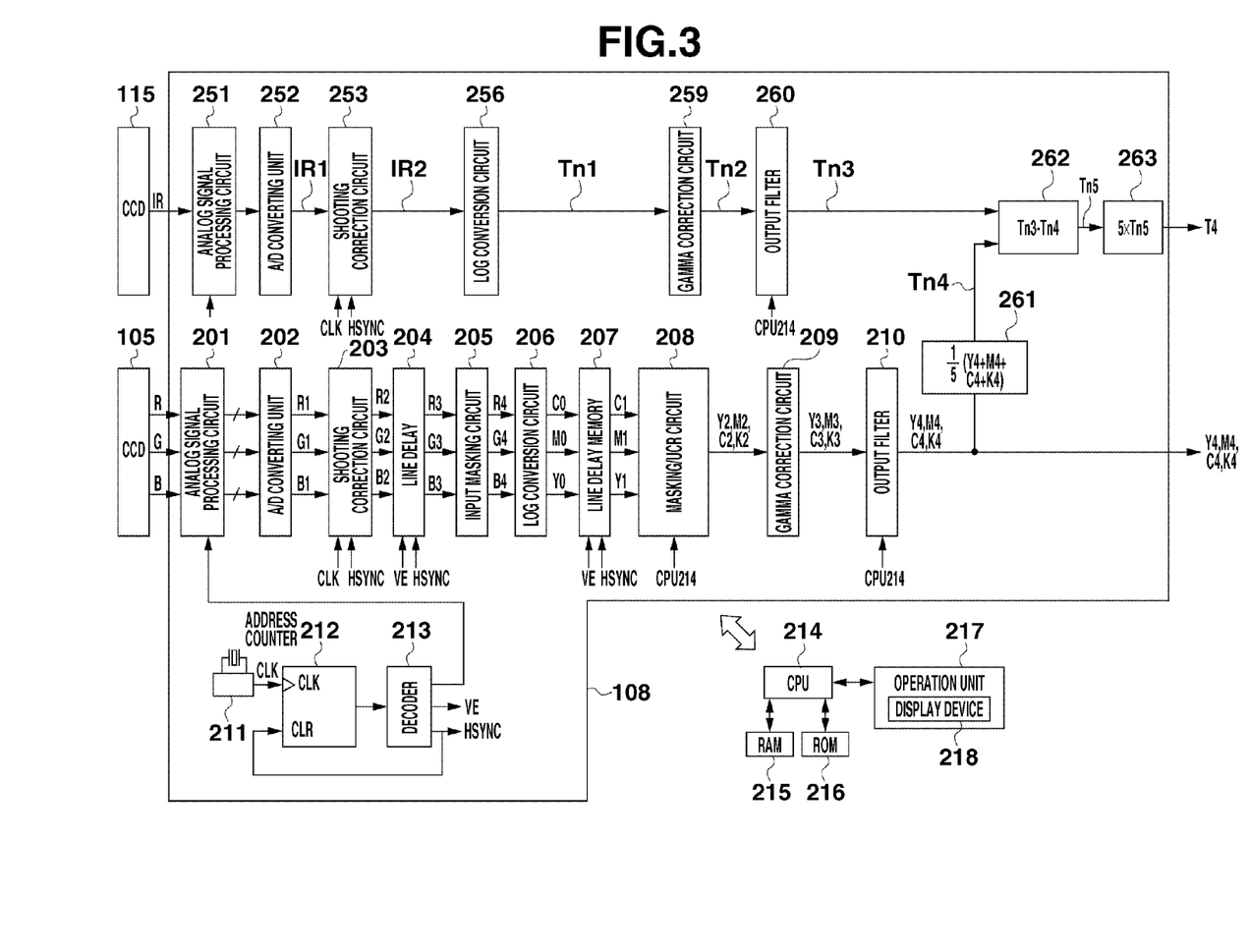
FIG. 3 is a block diagram illustrating a reader image processing unit.

FIG. 3 is a block diagram illustrating the reader image processing unit 108. An analog signal processing circuit 201 adjusts a gain and an offset of the image signals R, G, and B output from the CCD sensor 105. An analog/digital (A/D) conversion unit 202 then converts each of the image signals to 8-bit digital image signals R1, G1, and B1 respectively. A shading correction circuit 203 then performs shading correction on the image signals R1, G1, and B1 using a reading signal of the reference white color plate 106 for each color component. Image signals R2, G2, and B2 are thus output.

A clock generation unit 211 generates a clock (CLK) of one pixel unit. An address counter 212 counts the clock CLK and generates and outputs a main scan address signal for each line. A decoder 213 decodes the main scan address signal and generates a CCD drive signal of a line unit such as a shift pulse and a reset pulse, a signal VE which indicates a valid area in an image signal of one line output from the CCD sensor 105, and a line synchronization signal HSYNC. The address counter 212 is cleared by HSYNC and then starts counting the main scan address of the next line.

Each line sensor configuring the CCD line sensor 105 is arranged at a predetermined distance from each other in a sub-scanning direction (i.e., a direction perpendicular to the main scanning direction). A position displacement is thus generated between each of the line sensors. A line delay 204 corrects such a spatial displacement (i.e., position displacement) in the sub-scanning direction of each line sensor. More specifically, when the line sensors are arranged in the sub-scanning direction in order of R, G, and B and sequentially scan the document in that order, the line delay 204 delays the G signal in the sub-scanning direction by 1 line and the R signal by 2 lines with respect to the B signal. As a result, RGB signals R3, G3, and B3 can be acquired by reading the same line in the document.

An input masking circuit 205 converts a color space of the image signal which is determined by a spectral characteristic of a color optical filter of each line sensor in the CCD 105 to a predetermined color space (i.e., a standard color space of standard RGB (sRGB) and National Television System Committee (NTSC)). The input masking circuit 205 thus outputs image signals R4, G4, and B4. A log conversion circuit 20 then uses a look-up table to convert the image signals (i.e., luminance signals) R4, G4, and B4 (i.e., three primary colors of light) output from the input masking circuit 205 to density signals C0, M0, and Y0 (i.e., three primary colors). A line delay memory 207 delays the image signals C0, M0, and Y0 and thus outputs signals C1, M1, and Y1.

A masking/UCR circuit 208 extracts a black signal K from the input Y1, M1, and C1 primary color signals and sequentially outputs image signals Y2, M2, C2, and K2 at a predetermined bit width (i.e., 8 bit). A gamma correction circuit 209 then performs density correction of the image signals to adjust the image signals to match an ideal gradation characteristic of the printer unit B. Further, an output filter 210 performs edge enhancement or smoothing on the image signals and thus outputs image signals M4, C4, Y4, and K4. The image signals M4, C4, Y4, and K4 are then input to the printer control unit 110 as image data to be used in forming images in image forming stations Pb, Pc, Pd, and Pe in the printer unit B to be described below.

On the other hand, the CCD sensor 115 which reads the infrared light outputs an image signal IR. An analog signal processing circuit 251 adjusts a gain and an offset of the image signal IR, and an A/D conversion unit 252 then converts the image signal IR to an 8-bit digital image signal IR1. A shading correction circuit 253 then performs shading correction on the image signal IR1 using the reading signal of the reference white color plate 106. An image signal IR2 is thus output.

A log conversion circuit 206 uses the look-up table to convert the image signal (i.e., luminance signal) IR2 to a density signal Tn1. A gamma correction circuit 259 performs density correction of the image signal to adjust the image signal to match the ideal gradation characteristic of the printer unit B and thus outputs a density signal Tn2. An output filter 260 performs edge enhancement or smoothing on the image signal and outputs an image signal Tn3.

Operational circuits 261, 262, and 263 acquire a transparent toner adhering amount T4 using the toner adhering amount Tn3 which is acquired from the luminance of the reflected infrared light and the adhering amounts of toner Y4, M4, C4, and K4 which are acquired from the luminance of the visible light. More specifically, the operational circuit 261 adds the signals Y4, M4, C4, and K4 output from the output filter 210, divides the sum by 5, and outputs Tn4. The operational circuit 262 then subtracts Tn4 from Tn3 and outputs Tn5. The operation circuit 263 multiplies Tn5 by 5 and outputs T4 which is input to the printer control unit 110 as the image data for forming an image in an image forming station Pa of the printer unit B to be described below. As a result, the transparent toner adhering amount on the document is acquired, and the transparent toner image on the document can be copied on the sheet using the transparent toner.

A central processing unit (CPU) 214 performs control of each component in the reader image processing unit 108 and the reader unit A and image processing according to a program stored in a read-only memory (ROM) 216. A random access memory (RAM) 215 is used by the CPU 214 as a work memory. An operation unit 217 in the reader unit A is a user interface for an operator to input instruction and processing conditions to the CPU 214. A display unit 218 displays an operation status of the image forming apparatus including the reader unit A and the printer unit B, and the processing conditions.

The printer unit B will be described below with reference to FIG. 1. The printer unit B uses an intermediate transfer belt 51 as an intermediate transfer member to form an image on the sheet. The printer unit B includes the image forming stations Pa, Pb, Pc, Pd, and Pe, arranged in order along a rotational travelling direction of the intermediate transfer belt 51 indicated by an allow R51 illustrated in FIG. 1. The image forming stations Pa, Pb, Pc, Pd, and Pe form a first, second, third, fourth, and fifth toner images.

More specifically, the first, second, third, fourth, and fifth image forming stations Pa, Pb, Pc, Pd, and Pe form in order transparent (T), yellow (Y), magenta (M), cyan (C), and black (K) toner images. The transparent toner (T) is toner which becomes transparent when transferred to and fixed on a sheet S. The image forming stations Pa, Pb, Pc, Pd, and Pe each include drum-shaped image bearing members (hereinafter referred to as photosensitive drums) $1a$, $1b$, $1c$, $1d$, and $1e$ respectively as an image bearing member. Each photosensitive drum is rotationally driven at a process speed (i.e., peripheral velocity).

Process devices described below are arranged around the photosensitive drums $1a$, $1b$, $1c$, $1d$, and $1e$ in order from the upstream side along the rotational direction. More specifically, charging rollers $2a$, $2b$, $2c$, $2d$, and $2e$, exposure devices $3a$, $3b$, $3c$, $3d$, and $3e$, developing devices $4a$, $4b$, $4c$, $4d$, and $4e$, primary transfer rollers, i.e., transfer members, $5a$, $5b$, $5c$, $5d$, and $5e$, and cleaning devices $6a$, $6b$, $6c$, $6d$, and $6e$ are disposed in order from the upstream side to downstream. The exposure devices $3a$, $3b$, $3c$, $3d$, and $3e$ are controlled by the printer control unit 110 to which the image data T4, Y4, M4, C4, and K4 are input, and each expose a laser beam for forming yellow, magenta, cyan, and black latent images.

Figure 4:
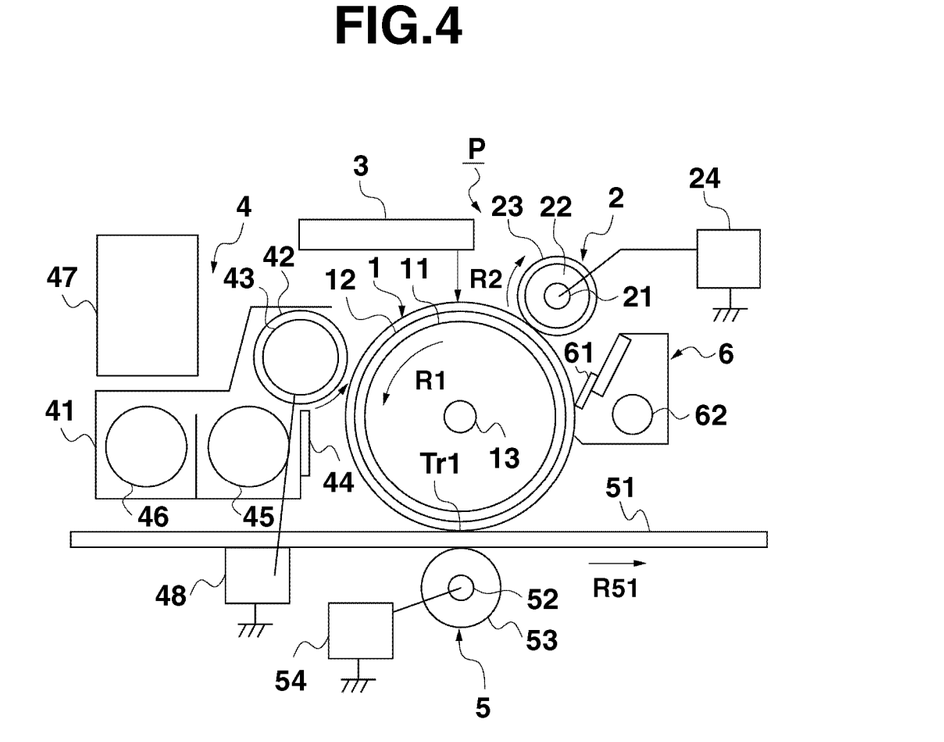
FIG. 4 illustrates a configuration of an image forming station.

FIG. 4 illustrates a configuration of the image forming station P. Since the basic configuration of the image forming stations Pa, Pb, Pc, Pd, and Pe are the same, the image forming station P will be described with reference to FIG. 4. Referring to FIG. 4, each image forming station P includes a rotatably supported photosensitive drum 1. The photosensitive drum 1 is a cylindrical organic photoconductor (OPC) photosensitive member basically formed of a conductive base body 11 such as aluminum and a photoconductive layer 12 formed on an outer periphery thereof. The photosensitive drum 1 is rotatably supported by a drum supporting shaft 13 at the center and rotates at a predetermined process speed (peripheral velocity) around the supporting shaft 13 in a direction indicated by an arrow R1 illustrated in FIG. 4.

A charging roller 2 is disposed above the photosensitive drum 1. The charging roller 2 contacts the surface of the photosensitive drum 1 and uniformly charges the drum surface to a predetermined electric potential. The charging roller 2 includes a metal core 21 disposed at the center thereof, and a low-resistance conductive layer 22 and a mid-resistance conductive layer 23 formed on the outer periphery of the metal core 21. Both ends of the metal core 21 of the charging roller 2 are rotatably supported by bearing members. The charging roller 2 is placed in parallel with the supporting shaft 13 of the photosensitive drum 1 and is biased towards a direction in which an elastic member such as a spring press-contacts the photosensitive drum 1. As a result, the charging roller 2 applies a press-contacting force on the photosensitive drum 1 and is thus rotary driven in a direction indicated by an arrow R2 illustrated in FIG. 4 along with the rotation of the photosensitive drum 1 in the direction indicated by the arrow R1. A power source 24 applies a charging bias voltage on the charging roller 2 and uniformly charges the surface of the photosensitive drum 1.

The exposure device 3 is disposed downstream of the charging roller 2 with respect to the rotational direction of the photosensitive drum 1. The exposure device 3 scan-exposes the charged surface of the photosensitive drum 1 by switching the laser beam on and off according to image information received from the printer control unit 110. The electric potential is then removed from the portion of the surface of the photosensitive drum 1 which has been irradiated with the laser beam, so that an electrostatic latent image is formed on the photosensitive drum 1.

The developing device 4 is disposed downstream of the exposure device 3. The developing device 4 includes a developer container 41 which contains a two-component developer configured of toner and a carrier. A developing sleeve 42 is rotatably attached on an opening portion of the developer container 41 opposite the photosensitive drum 1. A magnet roller 43 is fixedly disposed inside of the developing sleeve 42 to be non-rotatable with respect to the rotation of the developing sleeve 42 and causes the developer to be carried on the developing sleeve 42. A regulating blade 44 which forms a thin developer layer by regulating the developer carried on the developing sleeve 42 is disposed below the developing sleeve 42. Further, the developer container 41 is partitioned into a developing chamber 45 and an agitating chamber 46. A supply chamber 47 which contains supply toner and supplies the toner to the developer container 41 is disposed above the developer container 41.

The thin developer layer formed on the developing sleeve 42 is conveyed to a developing area opposite the photosensitive drum 1. A magnetic force of a developing main pole positioned in the developing area of the magnet roller 43 then causes the developer layer to stand like ears of grain, and a magnetic brush is thus formed by the developer. The power source 48 applies a developing bias voltage on the developing sleeve 42 while the magnetic brush rubs the surface of the photosensitive drum 1. As a result, the toner attached to the carrier forming the ears of the magnetic brush is attached to an exposed portion of the electrostatic latent image to develop the latent image and form a toner image on the photosensitive drum 1.

A primary transfer roller 5 is disposed below the photosensitive drum 1 downstream of the development device 4. The primary transfer roller 5 includes a metal core 52 on which a power source 54 applies a bias, and a conductive layer 53 cylindrically-formed on the circumference of the metal core 52. Both ends of the metal core 52 of the primary transfer roller 5 are biased towards the photosensitive drum 1 by elastic members such as springs. The conductive layer 53 of the primary transfer roller 5 thus press-contacts the surface of the photosensitive drum 1 via the intermediate transfer belt 51. A primary transfer portion (a primary transfer nip portion) T1 is then formed between the photosensitive drum 1 and the intermediate transfer belt 51. The intermediate transfer belt 51 is held in the primary transfer portion Tr1, and the power source 54 applies a transfer bias voltage which is opposite in polarity to the polarity of the toner. As a result, the toner image on the photosensitive drum 1 is transferred (primary-transferred) to the surface of the intermediate transfer belt 51.

A cleaning device 6 removes residual toner adhering to the photosensitive drum 1 after the toner image is transferred to the intermediate transfer belt 51. The cleaning device 6 includes a cleaner blade 61 and a conveying screw 62. The cleaner blade 61 press-contacts the photosensitive drum 1 at a predetermined angle and pressing force to collect the toner remaining on the surface of the photosensitive drum 1. The collected residual toner is discharged by the conveying screw 62 to be stored in a waste toner box 62. The waste toner discharged from each process unit and generated by a belt cleaner 60 to be described below are conveyed to the waste toner box 60 via a conveyance path (not illustrated).

Referring to FIG. 1, an intermediate transfer unit 59 is disposed below the photosensitive drums 1a, 1b, 1c, 1d, and 1e. The intermediate transfer unit 59 includes the intermediate transfer belt 51, a drive roller 55 and a driven roller 58 on which the intermediate transfer belt 51 is wound, a secondary transfer opposing roller 56, the primary transfer rollers 5a, 5b, 5c, 5d, and 5e, a secondary transfer roller 57, and a belt cleaner 60. The intermediate transfer belt 51 is held between the secondary transfer roller 57 and the secondary transfer opposing roller 56. A secondary transfer portion (a secondary transfer nip portion) is thus formed between the secondary transfer roller 57 and the intermediate transfer belt 51.

The toner image of each color formed on the photosensitive drums 1a, 1b, 1c, 1d, and 1e each receives in each primary transfer portion T1 a transfer bias from the primary transfer rollers 5a, 5b, 5c, 5d, and 5e respectively. The primary transfer rollers 5a, 5b, 5c, 5d, and 5e are disposed opposite the photosensitive drums 1a, 1b, 1c, 1d, and 1e via the intermediate transfer belt 51. The toner images of each color are then serially transferred (primary-transferred) to the intermediate transfer belt 51 and conveyed to the secondary transfer portion T2 along with the rotation of the intermediate transfer belt 51 in the direction indicated by the arrow R51.

A recording material S which is stored in a paper feed cassette 8 is fed by a paper feed roller 81 and conveyed by a conveyance roller 82 before the toner image is conveyed to the secondary transfer portion Tr2. A registration roller 83 supplies the recording material S to the secondary transfer portion T2 at the same timing as the toner image on the intermediate transfer belt 51. The toner image is thus transferred (secondary-transferred) to the surface of the recording material S in the secondary transfer portion T2 by a secondary transfer bias applied between the secondary transfer roller 57 and the opposing secondary transfer roller 56. The toner which is not transferred to the recording material S and remaining on the intermediate transfer belt 51 is removed by the belt cleaner 60 and is collected in the waste toner box 62.

The fixing device 7 includes a rotatable fixing roller 71 and a pressure roller 72 which rotates while press-contacting the fixing roller 71. A heater 73 such as a halogen lamp is disposed inside the fixing roller 71, and the temperature of the surface of the fixing roller 71 is adjusted by controlling a voltage applied to the heater 73. The recording material S is then conveyed to the fixing device 7 and passes between the fixing roller 71 and the pressure roller 72 that rotate at constant speeds. The recording material S is thus pressed and heated on both sides by proximately constant pressing force and temperature. As a result, an unfixed toner image on the surface of the recording material S is melted and fixed, and a full color image is formed onto the recording material S.

A sheet (an output product) which includes a non-highly glossy image portion (non-glossy portion) and a highly glossy image portion (glossy portion) will be described below. Such a sheet according to the present exemplary embodiment includes a non-glossy portion (i.e., a first portion such as a base of the sheet) and a highly glossy portion (i.e., a second portion with a higher degree of glossiness compared to the first portion). Not entire surface of the sheet is thus highly glossy. A difference in surface textures of the non-highly glossy portion and the highly glossy portion generates a difference in visibility. By using such a feature, images, patterns, and characters are formed according to the highly glossy portion and the non-highly glossy portion, to add value to the output product.

The image forming station P forms a transparent toner image of a predetermined density on the highly glossy portion. The smoothness of the highly glossy portion is thus higher than the base portion of the sheet or a portion in which other color toner images are formed. The images in the highly glossy portion are only formed by the transparent toner and not by other color toners. The highly glossy portion is not limited to a portion in which the transparent toner images are formed, and the highly glossy portion may also be formed by other surface processing or coating. Further, a color image according to the present exemplary embodiment includes a black color image to be identifiable from a colorless highly-glossy image.

Figure 5:
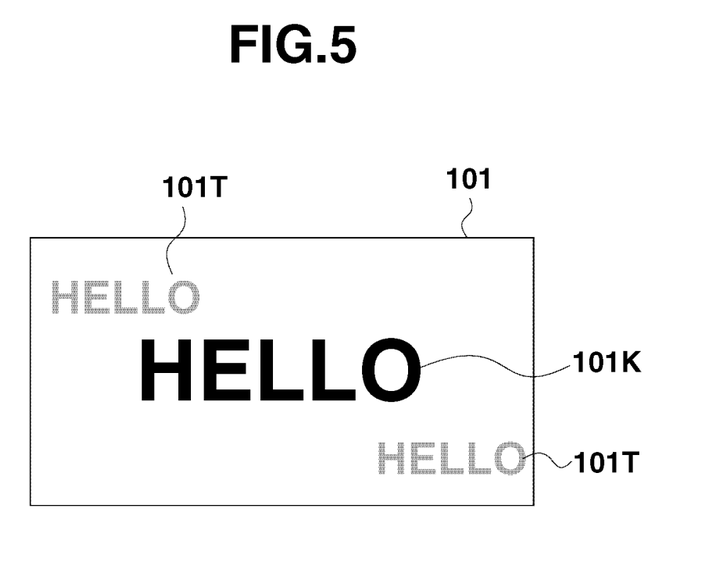
FIG. 5 illustrates an output product including a highly glossy portion.
Figure 6A:
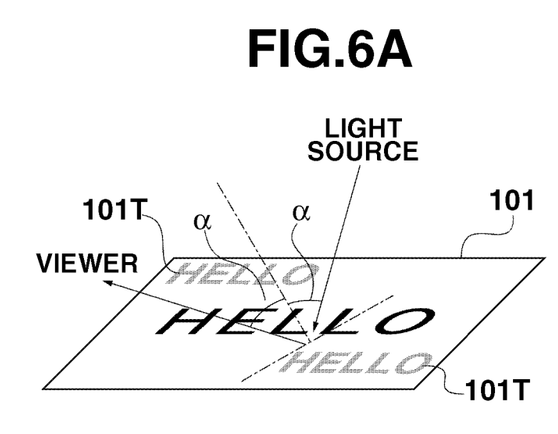
FIGS. 6A and 6B illustrate how an output product including a highly glossy portion is viewed.
Figure 6B:
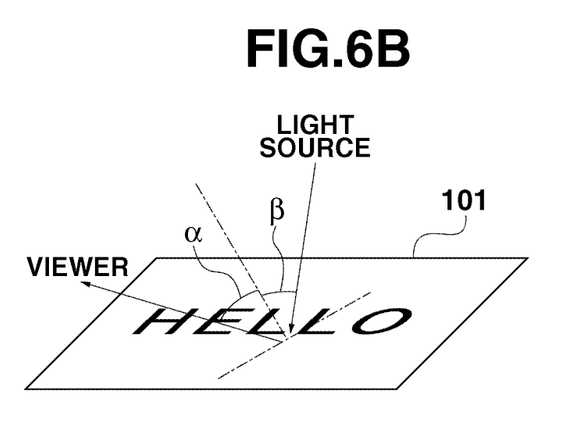

FIG. 5 illustrates an example of an output product including the highly glossy portion, i.e., a sheet 101 on which a transparent toner image 101T and a black toner image 101K are formed. The transparent toner image 101T is the highly glossy portion, and other portions are the non-highly glossy portions. If a light source and a viewer are positioned with respect to such an image to generate mirror reflection (i.e., an incident angle β and an output angle α of light are the same) as illustrated in FIG. 6A, the viewer can clearly recognize the highly glossy portion 101T. However, if the light source and the viewer are positioned with respect to such an image not to generate mirror reflection (i.e., an incident angle β and an output angle α of light are different) as illustrated in FIG. 6B, it becomes difficult for the viewer to recognize the highly glossy portion 101T.

Figure 7:
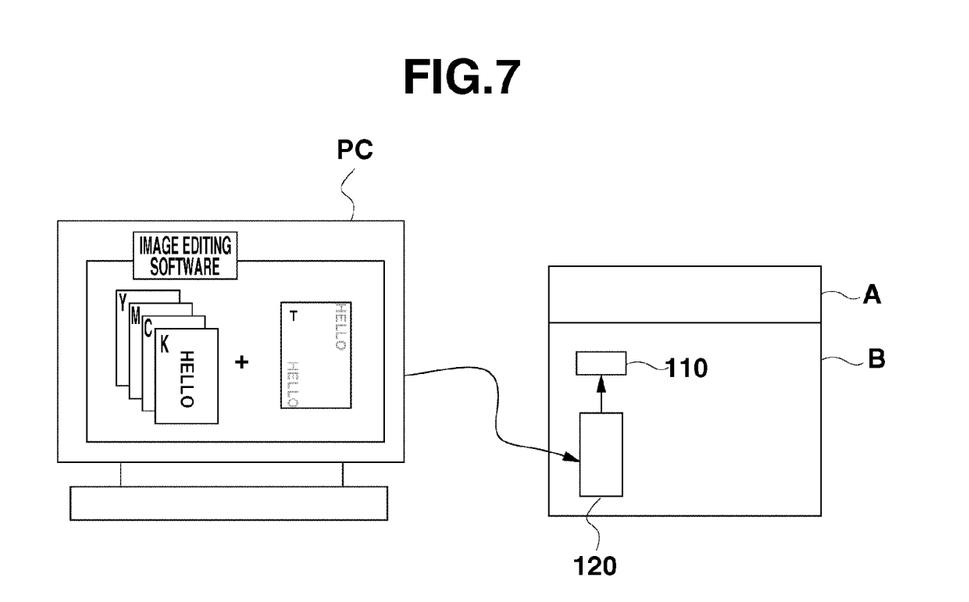
FIG. 7 illustrates creation of an output product including a highly glossy portion.

A method for creating an output product including the highly glossy portion will be described below. Referring to FIG. 7, the printer unit B is connectable to a personal computer (PC) and can form on the sheet S an image edited by employing image editing software running on the PC. Aversion of a color image portion (in RGB or YMCK) (i.e., color image data) and a version of the highly glossy image portion (T) (i.e., characteristic image data) are then created using the image editing software.

The created image data are transferred to a controller 120 of the printer B via a printer driver installed in the PC. The controller 120 stores the color image data and the characteristic image data in a memory and converts the color image data to YMCK toner data.

The controller 120 only determines whether there is image information in the characteristic image data. The controller 120 sets percentages of transparent toner data to 0% for a portion determined not to include image information and 70% for a portion determined to include image information. The percentage of the toner data is defined based on a maximum toner amount for one color as 100% (e.g., a toner amount per unit area as 0.55 mg/cm$^2$) according to a fixing capability of the image forming apparatus. The transparent toner data is set to 70% to acquire high image quality by limiting a total toner amount including the color toner portion to an amount which can be transferred and processed by a fixing system in forming an image in the printer unit. Further, the transparent toner portion becomes visible at approximately 70% transparent toner amount, so that highly glossy portion can be expressed by the transparent toner.

The controller 120 transmits the toner data to the printer control unit 110 which then controls the exposure devices 3a, 3b, 3c, 3d, and 3e based on the TYMCK toner data. As a result, the output product as illustrated in FIG. 6 can be acquired.

When the reader unit A reads as the document the output product including the transparent toner image acquired as described above, the reader unit A extracts the transparent toner image on the document as described above. The printer unit B can then copy the transparent toner image onto the sheet using the transparent toner.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-113569 filed May 8, 2009, which is hereby incorporated by reference herein in its entirety.

What is claimed is:

1. A document reading apparatus comprising:
   an irradiation unit configured to irradiate a document reading position with visible light and infrared light;
   a reading unit configured to read an image of visible light and an image of infrared light reflected from the document on the document reading position; and a generation unit configured to generate color toner image data based on visible light image data corresponding to the image of the visible light and to generate transparent toner image data based on the visible light image data corresponding to the image of visible light and infrared light image data corresponding to the image of the infrared light.

2. The document reading apparatus according to claim 1, wherein the generation unit generates the transparent toner image data by subtracting the visible light image data from the infrared light image data.

3. The document reading apparatus according to claim 1, wherein an image of the document includes a transparent toner image formed of transparent toner and a color toner image formed of color toner, and wherein the transparent toner and the color toner absorb infrared light.

4. The document reading apparatus according to claim 3, wherein the transparent toner and the color toner include polyester resin.

5. An image forming apparatus which forms a transparent toner image and a color toner image on a sheet using transparent toner and color toner based on the transparent toner image data and the color toner image data generated by the document reading apparatus according to claim 1.

6. The image forming apparatus according to claim 5, wherein the color toner includes yellow, magenta, cyan and black toners.

* * * * *